United States Patent

Foo

Patent Number: 6,022,114
Date of Patent: Feb. 8, 2000

[54] ANAMORPHIC AFOCAL BEAM SHAPING ASSEMBLY

[75] Inventor: Leslie D. Foo, San Jose, Calif.

[73] Assignee: Nikon Corporation, Tokyo, Japan

[21] Appl. No.: 09/071,749

[22] Filed: May 1, 1998

[51] Int. Cl.⁷ .............................. G02B 5/10; G02B 17/00; G02B 13/08

[52] U.S. Cl. ........................ 359/853; 359/858; 359/869; 359/728; 359/668

[58] Field of Search ..................... 359/850, 853, 359/858, 867, 869, 633, 637, 728, 730, 668

[56] References Cited

U.S. PATENT DOCUMENTS

| | | | |
|---|---|---|---|
| 1,581,659 | 4/1926 | Roach | 359/858 |
| 2,720,813 | 10/1955 | Cox | 359/671 |
| 2,869,423 | 1/1959 | Hoge et al. | 359/858 |
| 2,956,475 | 10/1960 | Harris et al. | 359/668 |
| 3,118,437 | 1/1964 | Hunt | 359/853 |
| 3,811,749 | 5/1974 | Abel | 359/728 |
| 4,239,342 | 12/1980 | Aurin et al. | 359/858 |
| 4,828,371 | 5/1989 | McCaslin et al. | 359/669 |
| 4,872,747 | 10/1989 | Jalkio et al. | 359/669 |
| 4,947,402 | 8/1990 | Kane | 359/858 |
| 5,214,540 | 5/1993 | Yakimovsky | 359/858 |
| 5,383,052 | 1/1995 | Okazaki et al. | 359/364 |
| 5,440,423 | 8/1995 | Ogura | 359/853 |
| 5,477,394 | 12/1995 | Shibazaki | 359/858 |
| 5,574,601 | 11/1996 | Hall | 359/853 |
| 5,581,605 | 12/1996 | Murakami et al. | 378/84 |
| 5,652,679 | 7/1997 | Freeman | 359/728 |
| 5,694,250 | 12/1997 | Anderson | 359/858 |
| 5,726,807 | 3/1998 | Nakaoka et al. | 359/630 |
| 5,765,028 | 6/1998 | Morimoto et al. | 359/843 |
| 5,864,390 | 1/1999 | Johnson et al. | 355/67 |

FOREIGN PATENT DOCUMENTS

| 5-72477 | of 1993 | Japan . |
|---|---|---|
| 5-72477 | 3/1993 | Japan . |

*Primary Examiner*—Georgia Epps
*Assistant Examiner*—Evelyn A. Lester
*Attorney, Agent, or Firm*—H. Donald Nelson

[57] ABSTRACT

An anamorphic system and method having first and second reflective anamorphic surfaces producing different magnifications in orthogonal directions in a collimated beam of radiation incident on the first anamorphic surface. The anamorphic surfaces have parabolic cross-sections in the two orthogonal directions. The parabolic cross-sections have base radii of curvatures and the magnifications in the first and second directions are determined by the ratio of the base radii of curvatures in the first and second directions.

20 Claims, 7 Drawing Sheets

ANAMORPHIC AFOCAL BEAM SHAPING ASSEMBLY

FIELD OF THE INVENTION

This invention relates generally to an apparatus and method for producing a uniformly illuminated area having a desired shape. More specifically, this invention relates to an anamorphic afocal beam shaping apparatus and method for producing a uniformly illuminated area having a desired shape, minimum optical aberrations, a non-obscured output beam and high efficiency. Even more specifically, this invention relates to an anamorphic afocal beam shaping apparatus and method using off-axis segments of parent anamorphic surfaces.

BACKGROUND OF THE INVENTION

When collimated (parallel) radiation is incident upon the input of a lens system, radiation exiting from the output end will show one of three characteristics: (1) it will converge to a real point focus outside the lens system, (2) it will appear to diverge from a virtual point focus within the lens system, or (3) it will emerge as collimated radiation that may differ in some characteristics from the incident collimated radiation. In cases 1 and 2, the paraxial imaging properties of the lens system can be modeled accurately by a characteristic focal length and a set of fixed principal surfaces. Such lens systems are sometimes referred to as focusing or focal lenses, however they are usually referred to simply as lenses. In case 3, a single finite focal length cannot model the paraxial characteristics of the lens system; in effect, the focal length is infinite, with the output focal point an infinite distance behind the lens, and the associated principal surface an infinite distance in front of the lens. Such lens systems are referred to as "afocal," or without focal length. They are referred to as "afocal lenses," following the common practice of using "lens" to refer to both single element and multi-element lens systems.

A simple afocal lens can be made up of two focusing lenses set up so that the rear focal point of the first lens coincides with the front focal point of the second lens. There are two general classes of simple afocal lenses, one in which both focusing lenses are positive, and the other in which one of the two is negative. Afocal lenses containing two positive lenses were first described by Johannes Kepler and are called Keplerian. Afocal lenses containing a negative lens are called Galilean. Generally, afocal lenses contain at least two powered surfaces, with the simplest model for an afocal lens consisting of two thin lenses.

The combination of a first lens having a positive refractive power (the "first" lens being the lens nearest the object) and a second lens having a negative refractive power is a Galilean configuration. The combination with the first lens having a negative refractive power and the second lens having a positive refractive power is referred to as an inverse Galilean configuration.

Afocal attachments to lens systems can compress or expand the scale or shape of an image in one axis. Such devices are called "anamorphosers," or "anamorphic afocal attachments." One class of anamorphoser is the cylindrical galilean telescope. The keplerian form is seldom if ever used, since a cylindrical keplerian telescope would introduce image inversion in one direction. Anamorphic compression can also be obtained using two prisms.

There are increasing requirements for illumination systems that can provide anamorphic beam shaping. One such requirement is in the field of photolithography in which illumination of a non-symmetrical area with collimated energy is needed. Another such requirement is in the field of laser beam shaping in which, for example, there is a need to shape the elliptical output from a semiconductor diode laser into a desired circular output shape. Another requirement is to provide beam shaping in those spectral regions in which there are no refractive materials appropriate for the energy in those spectral regions, for example x-ray applications.

A current method of producing an illuminated area having a desired shape is shown in FIG. 1 in which a collimated beam 102 having a power $P_{IN}$ illuminates a mask 104 with an aperture 106 having the shape of the desired illuminated area 100. The illuminated area 100 has a power $P_{OUT}$ that is less than $P_{IN}$ and $P_{OUT}$ depends upon the size of the aperture 106 relative to the size of the input collimated beam 102. This method is satisfactory if efficiency is not a problem or concern in the system. The efficiency $\eta = P_{OUT}/P_{IN}$ where $P_{OUT}$ is the power in the output beam 100 and $P_{IN}$ is the power in the input beam 102. As can be appreciated the efficiency can be very low.

Another method of providing a scaled or shaped beam has been to use prisms or cylindrical lenses to provide anamorphic scaling of input beams. Such an anamorphic system 200 is shown in FIG. 2. The anamorphic system 200 has a positive cylindrical lens element 202 and a negative cylindrical lens element 204 to shape an incoming beam 206 into an anamorphic output beam 208. The efficiency $\eta$ of such a system is $P_{OUT}/P_{IN}$ where $P_{OUT}$ is the power in the output beam 208 and $P_{IN}$ is the power in the input beam 206. Assuming there is no transmission loss in the lens elements, the efficiency $\theta \approx 1$. However, the lens option is limited to spectral regions for which there are refractive materials available to construct cylindrical lenses or prisms. In addition, if the input beam is broad band, the lens assembly introduces chromatic aberration.

FIG. 3 shows a mirror equivalent 300 to the anamorphic system 200 shown in FIG. 2. An input beam 302 is incident on Mirror, 304, and then on Mirror$_2$ 306. To obtain anamorphic shaping, a surface of Mirror$_1$ 304 and Mirror$_2$ 306 are cylindrical. The output beam 308 is shown rotated 90° for illustrative purposes and indicates anamorphic scaling of the output beam 308. When the system is configured having a common axis as shown in FIG. 3, the output beam 308 has the central region 310 obscured because of Mirror$_1$ 304. The obscuration 310 is the shadow of Mirror$_1$ 304.

The prior art systems discussed above either have low efficiency, exhibit optical aberrations or have an obscured output beam.

Accordingly, there is a need for an apparatus and method for producing an afocal, uniformly illuminated area having a desired shape with high transmission efficiency and minimum optical aberrations.

SUMMARY OF THE INVENTION

According to the present invention, the foregoing and other advantages are attained by an anamorphic system and method having first and second reflective anamorphic surfaces. The reflective anamorphic surfaces produce different magnifications is orthogonal directions in a beam of collimated radiation. In one aspect of the invention the anamorphic surfaces have parabolic cross-sections with base radii of curvatures. The magnification of the beam in each direction is determined by the ratio of the radii of the parabolic cross-sections in each direction in the first and second anamorphic surfaces.

These and other advantages of the present invention will become more apparent upon a reading of the detailed description of the preferred embodiment or embodiments that follow, when considered in conjunction with the drawings of which the following is a brief description. It should be clear that the drawings are merely illustrative of the currently preferred embodiment of the present invention, and that the invention is in no way limited to the illustrated embodiments. As will be realized, the invention is capable of other embodiments and its several details are capable of modifications in various obvious aspects, all without departing from the scope of the invention. The present invention is best defined by the claims appended to this specification.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of illustrative embodiments when read in conjunction with the accompanying drawings, wherein:

DETAILED DESCRIPTION

The following detailed description is of the presently preferred embodiments of the present invention. It is to be understood that while the detailed description is given utilizing the drawings briefly described above, the invention is not limited to the illustrated embodiments. In the detailed description, like reference numbers refer to like elements.

Figure 1:
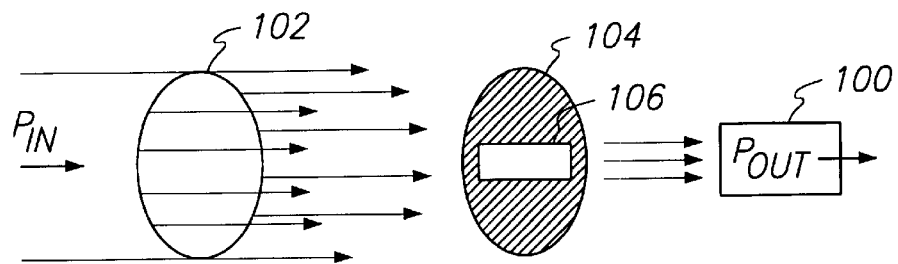
FIG. 1 illustrates a prior art apparatus for obtaining a shaped beam by illuminating an aperture in a mask.
Figure 2:
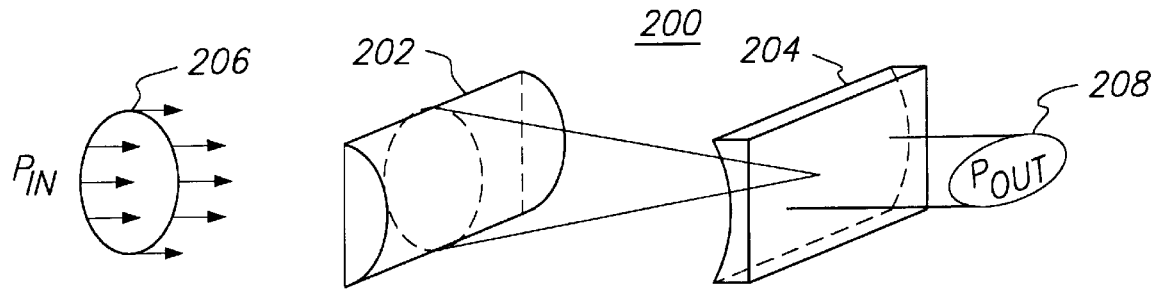
FIG. 2 illustrates a prior art apparatus for obtaining a shaped beam by using cylindrical lens element to obtain anamorphic scaling of an input beam.
Figure 3:
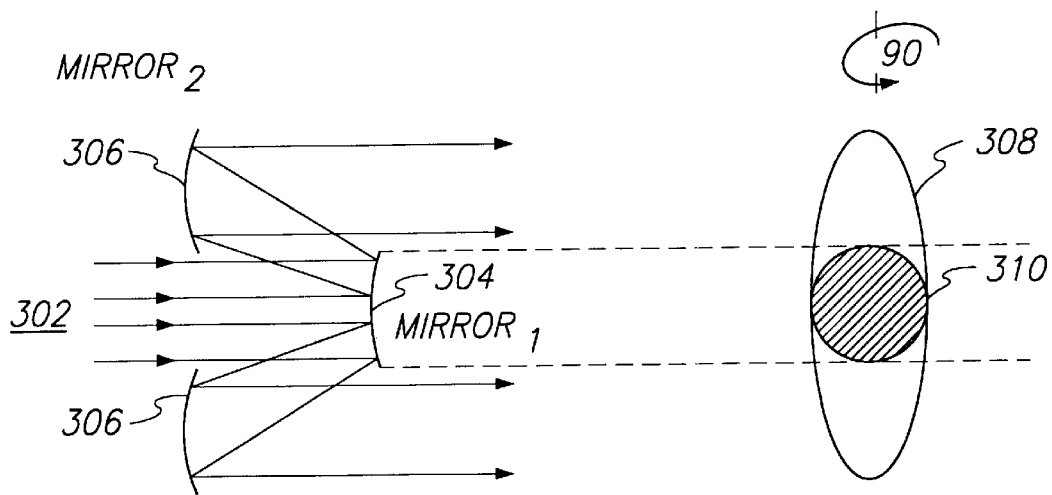
FIG. 3 illustrates a prior art mirror equivalent of the apparatus shown in FIG. 2.
Figure 4:
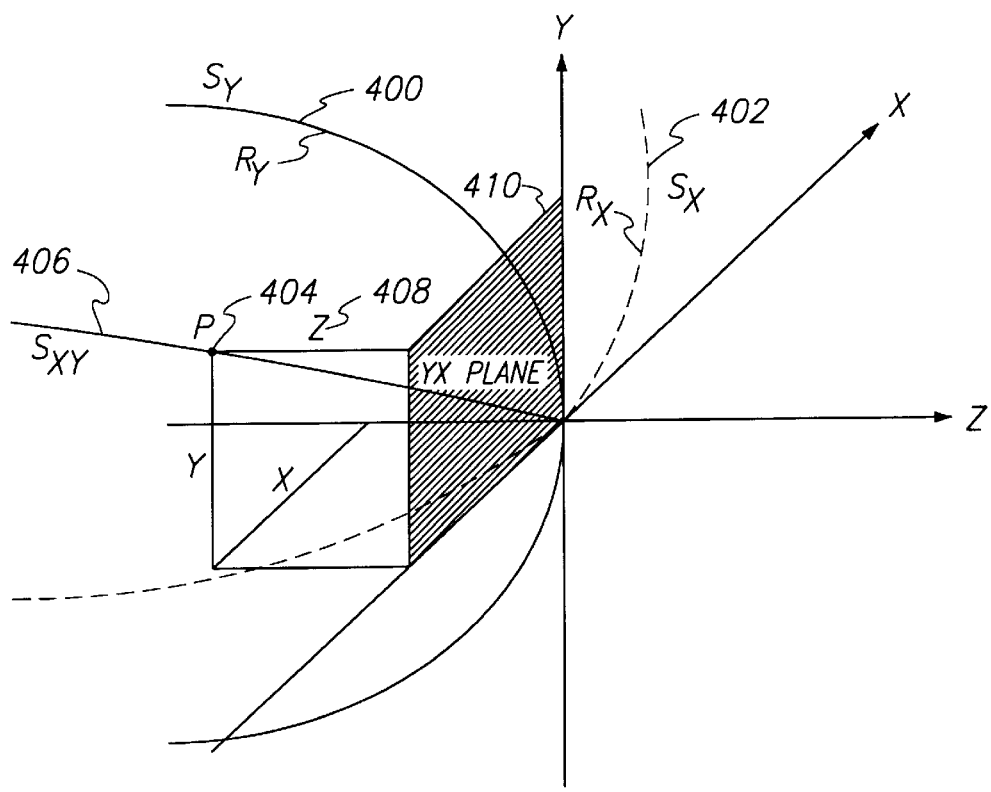
FIG. 4 shows the relationships of the parameters defining a conic surface.

FIG. 4 shows an aspheric surface with bilateral symmetry in both the x direction and the y direction but not necessarily having rotational symmetry. The curve $S_y$ 400 is an aspheric curve in the y-z plane. The curve $S_x$ 402 is an aspheric curve in the x-z plane. The point P 404 is on the curve $S_y$ 406. The curve $S_y$ 402 is characterized by a base radius of curvature $R_y$ and the curve $S_x$ is characterized by a base radius of curvature $R_x$. The curvature $C_y$ the curve $S_y$ is $1/R_y$ and the curvature $C_x$ of the curve $S_x$ 402 is $1/R_x$. The value z 408 is the sag (the distance of the point P 404 from the y-x plane 410). The sag z 408 is calculated as follows:

$$z=(C_x x^2+C_y y^2)/[1+SQRT\{1-(1+K_x)C_x^2 x^2-(1+K_y)C_y^2 y^2\}]$$

where $K_y$ and $K_x$ are the conic coefficients in x and y, respectively, and correspond to eccentricity in the same way as K for the asphere surface type and have the following values:

| | |
|---|---|
| k = 0 | sphere |
| −1 < k < 0 | ellipsoid with major axis on the optical axis (prolate spheroid) |
| k = −1 | paraboloid |
| k < −1 | hyperboloid |

Also, $k=-e^e$, where e is eccentricity. For

| | |
|---|---|
| k > 0 | oblate spheroid (not a conic section) the surface is generated by rotating an ellipse about its minor axis and |

$k=e^2/(1-e^2)$, where e is the eccentricity of the generating ellipse.

Figure 5A:
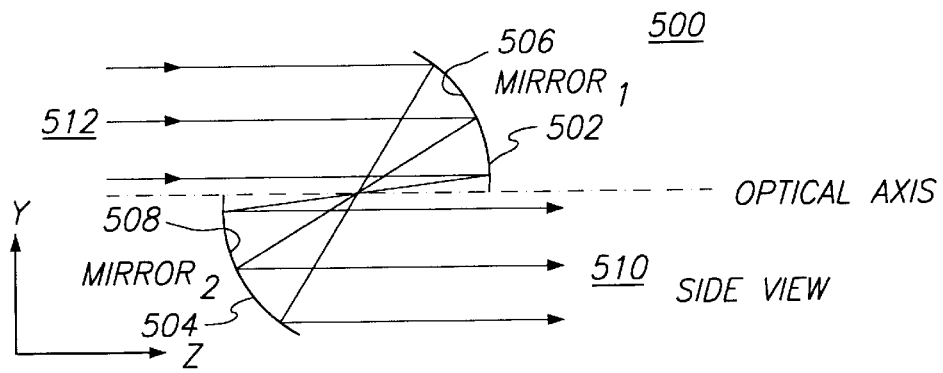
FIG. 5A is a side view of an anamorphic system in accordance with the present invention.

FIG. 5A is a side view of a reflective anamorphic system 500 that produces an afocal, non-obscured beam with no optical aberration. An anamorphic system provides anamorphic magnification, which is defined as different magnification of the image in each of two orthogonal directions. The reflective anamorphic system 500 includes Mirror$_1$ 502 and Mirror$_2$ 504. The surface 506 defined by the y-z plane of Mirror$_1$ 502 and the surface 508 defined by the y-z plane of Mirror$_2$ 504 each have parabolic cross-sections in the respective planes. Mirror$_1$ 502 and Mirror$_2$ 504 are off-axis portions of anamorphic surfaces. In orthogonal directions, the anamorphic surfaces 506 and 508 have parabolic cross sections, either concave or convex. The mirrors 502 and 504 have common foci in their respective planes. Mirror$_1$ 502 has a parabolic cross-section in the y-z plane. $R_{1y}$ is the base radius of curvature of the parabolic cross-section of surface 506 in the y-z plane and $K_{1y}$ is a conic constant of the parabolic cross-section of the surface 506 in the y-z plane and $K_{1y}=-1$. Mirror$_2$ 504 also has a parabolic cross-section in the y-z plane. $R_{2y}$ is the base radius of curvature of the parabolic cross-section of the surface 508 in the y-z plane and $K_{2y}$ is a conic constant of the parabolic cross-section of the surface 508 in the y-z plane. If $R_{2y}=R_{1y}$, the magnification in the y direction is $M_y=R_{2y}/R_{1y}=1$. With a magnification $M_y=1$, the outgoing beam 510 will have the same dimension in the y-z plane as the incoming beam 512.

Figure 5B:
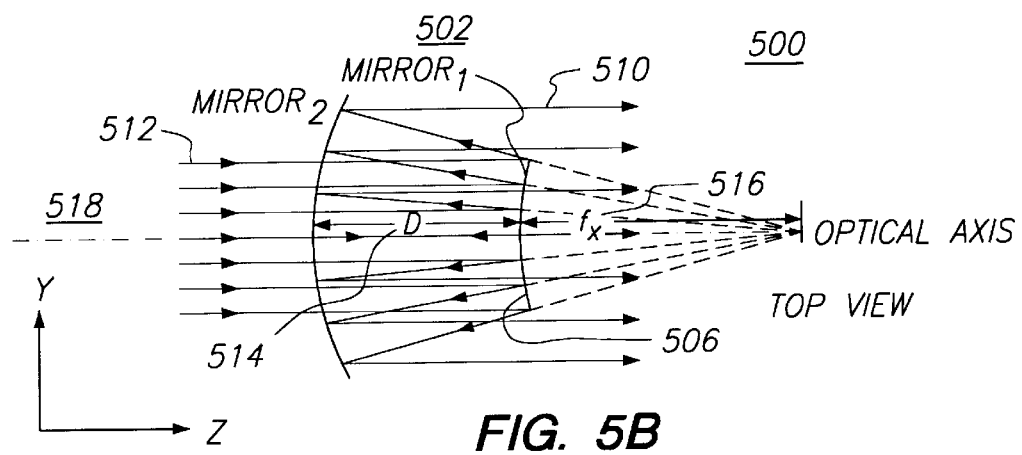
FIG. 5B is a top view of the anamorphic system shown in FIG. 5A.

FIG. 5B illustrates the top view of the reflective anamorphic system 500 shown in FIG. 5A. The surface 506 defined by the x-z plane of Mirror$_1$ 502 and the surface 508 defined by the x-z plane of Mirror$_2$ 504 each have parabolic cross-sections in the respective planes. $R_{1x}$ is the base radius of curvature of the surface 506 in the x-z plane and $K_{1x}$ is a conic constant of the parabolic cross-section of the surface 506 in the x-z plane and $K_{1x}=-1$. $R_{2x}$ is the base radius of curvature of the surface 508 in the x-z plane and $K_{2x}$ is the conic constant of parabolic cross-section of the surface 508 and $K_{2x}=-1$. $R_{2x}=2(D+f_x)$ where D is the axial distance 514 between surface 506 of Mirror$_1$ 502 and surface 508 of Mirror$_2$ 504 and $f_x$ is the axial focal length 516 of Mirror$_2$ in the x-z plane. The magnification $M_x$ in the x direction= $f_{2x}/f_{1x}=R_{2x}/R_{1x}=2(D+f_x)/R_{1x}$. Since Mirror$_1$ 502 and Mirror$_2$ 504 have parabolic cross-sections in orthogonal directions, they produce foci with no aberrations when illuminated with collimated radiation that propagates along the common optical axis 518 of the two mirrors 502 and 504. This is similar to the afocal Cassegrain-Mersenne telescope configuration, which is composed of two confocal paraboloids working at infinite conjugates and is an afocal system with magnification. In such a system, all third order aberrations, except field curvature, are corrected by surfaces that have parabolic cross-sections. Because there are no refractive elements, the all-reflective aspect of the reflective anamorphic system 500 is well suited for applications for which there are no suitable refractive materials, such as applications using x-rays.

Figure 6:
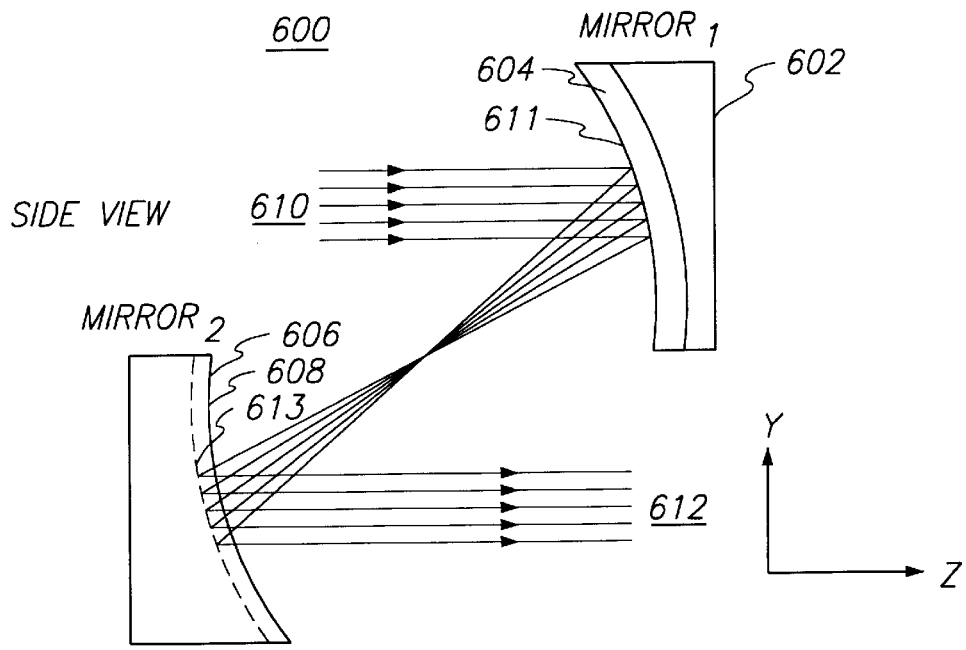
FIG. 6 is a side view of an anamorphic system having parabolic cross-sections.

FIG. 6 is a side view of a reflective anamorphic system 600 having mirror surfaces with parabolic cross-sections in orthogonal directions to provide anamorphic magnification. The anamorphic system 600 includes Mirror$_1$ 602 having a surface 604, which has a reflective concave parabolic cross-section of the anamorphic surface 604 in the y-z direction. $R_{1y}$ is the base radius of curvature of the parabolic cross-section of the anamorphic surface 604 in the y-z direction. $K_{1y}$ is a conic constant of the parabolic cross-section of the anamorphic surface 406 in the y-z plane. The anamorphic system also includes Mirror$_2$ 606 having a surface 608, which is a reflective concave parabolic cross-section of the anarnorphic surface 604 in the y-z direction. $R_{2y}$ is the base radius of curvature of the parabolic cross-section of the anamorphic surface 608 in the y-z direction. $K_{2y}$ is a conic constant of the parabolic cross-section of the anamorphic surface 608 in the y-z plane. A collimated beam of radiation 610 is incident on the anamorphic surface 604 and is reflected to the reflective anamorphic surface 608 where it is reflected as a collimated beam 612. The collimated beam of radiation 610 shown in FIG. 6 represents the portion of the radiation in the y plane. The line 611 on the surface 604 is the apex of the convex parabolic cross-section of the anamorphic surface 604. The line 613 is the bottommost or nadir of the anamorphic surface 608.

Figure 7:
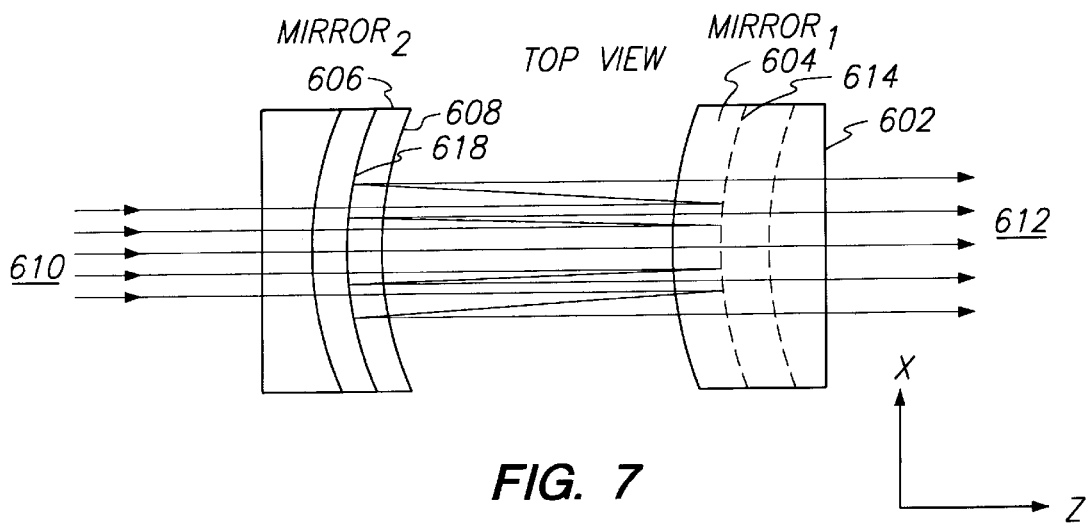
FIG. 7 is a top view of the anamorphic system shown in FIGS. 6.

FIG. 7 is the top view of the reflective anamorphic system 600 shown in FIG. 6. The surface 604 defined by the x-z plane of Mirror$_1$ 602 and the surface 608 defined by the x-z plane of Mirror$_2$ 606 each have parabolic cross-sections in the respective planes. $R_{1x}$ is the base radius of curvature of the parabolic cross-section of the anamorphic surface 604 in the x-z direction. $K_{1x}$ is a conic constant of the parabolic cross-section of the anamorphic surface 604 in the x-z direction. $R_{2x}$ is the base radius of curvature of the parabolic cross-section of the anamorphic surface 608 in the x-z direction. $K_{2x}$ is a conic constant of the parabolic cross-section of the anamorphic surface 608 in the x-z direction. Mirror$_1$ 602 and Mirror$_2$ 606 have surfaces 604 and 608 respectively, each of which is based upon an off-axis portion of an anamorphic surface. The dotted line 614 is an intermediate portion of the surface 604 indicating where a central horizontal portion of the beam of radiation would strike the surface 604. Similarly, the line 618 is an intermediate portion of the surface 608. The input beam 610 shown in FIG. 7 represents radiation in the x-z plane incident on the surface 604. The output beam 612 represents radiation in the x-z plane output from the surface 608.

Figure 8:
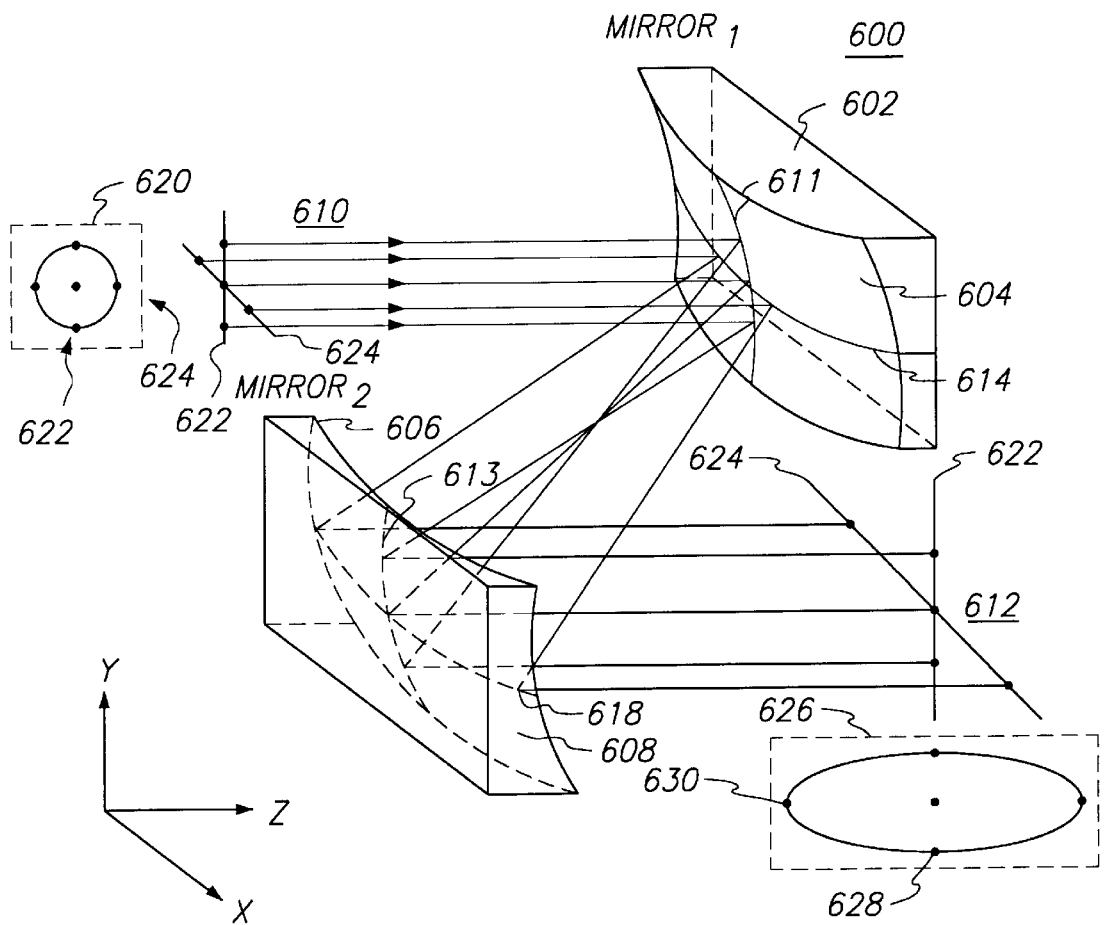
FIG. 8 is a perspective view of the anamorphic system shown in FIGS. 5 & 6.

FIG. 8 is a perspective view of the reflective anamorphic system 600 shown in FIGS. 6 & 7. The dotted box 620 shows the shape of the incoming collimated beam 610 showing 5 ray incidence points that are incident on surface 604 of Mirror$_1$. There is shown a vertical grouping of points 622 in the y direction and a horizontal grouping or points 624 in the x direction. The dotted box 626 shows the outgoing shape of the collimated beam 612 showing the 5 ray incidence points leaving the anamorphic system 600. The grouping of points 628 in the y direction are shown having the same vertical separation indicating no magnification in the y direction. The grouping of points 630 in the x direction are shown expanded indicating a positive magnification in the x direction. An example of the utility of this invention can be observed by assuming that $R_{1y}=4$, $K_{1y}=-1$, $R_{2y}=4$ and $K_{2y}=-1$. Then the beam scaling or magnification in the y direction $R_{2y}/R_{1y}=4/4=1$. If $R_{1x}=4$, $K_{1x}=-1$, $R_{2x}=12$ and $K_{2x}=-1$, then the beam scaling or magnification in the x direction=$R_{2x}/R_{1x}=12/4=3$. This gives a 3:1 aspect ratio (x:y)from the original 1:1 aspect ratio.

FIGS. 9A–D illustrate how Keplerian and Galilean lens configurations are used to shape an incoming beam by expanding or magnifying (positive magnification) the beam or by compressing or de-magnifying (negative magnification) the beam.

Figure 9A:
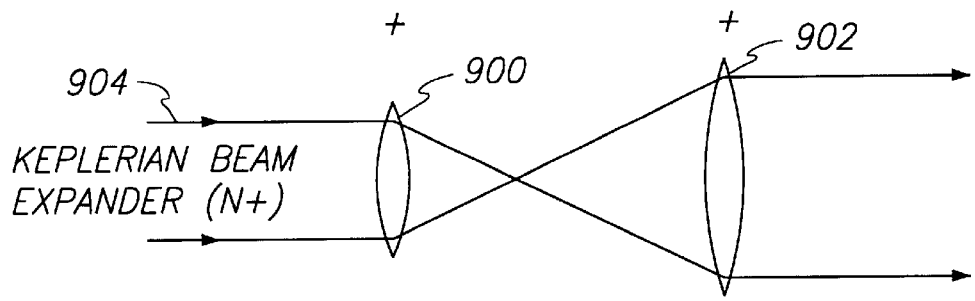
FIG. 9A shows a Keplerian lens configuration in a beam expander configuration.

FIG. 9A shows two positive lens elements 900 and 902 in a Keplerian configuration to expand an incoming collimated beam of radiation 904 to an extent depending upon the relative powers of the lens elements 900 and 902.

Figure 9B:
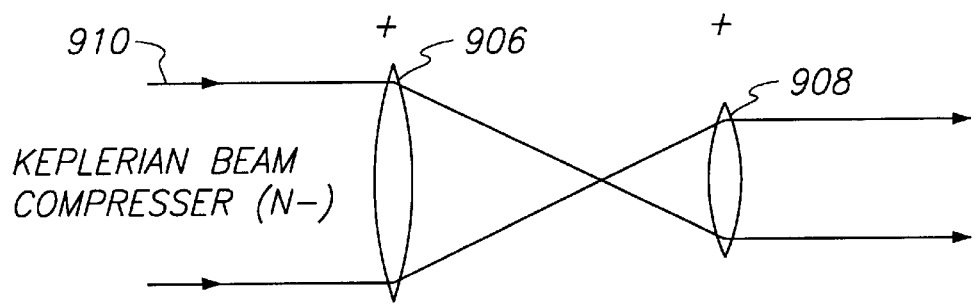
FIG. 9B shows a Keplerian lens configuration in a beam compressor configuration.

FIG. 9B shows two positive lens elements 906 and 908 in a Keplerian configuration to de-magnify or compress an incoming collimated beam 910 of radiation to an extent depending upon the relative powers of the lens elements 906 and 908.

Figure 9C:
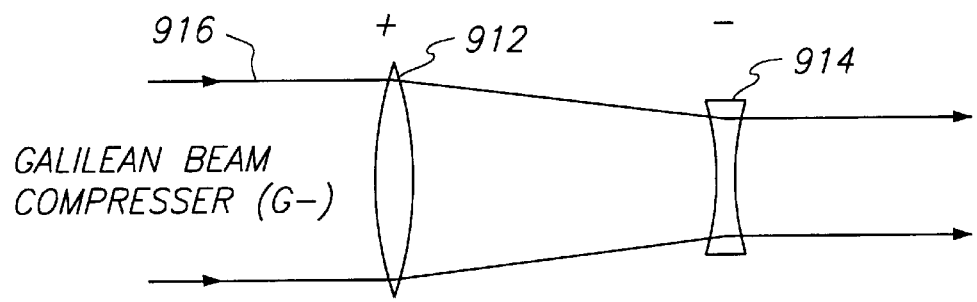
FIG. 9C shows a Galilean lens configuration in a beam compressor configuration.

FIG. 9C shows a positive lens element 912 and a negative lens element 914 in a Galilean configuration to de-magnify or compress an incoming collimated beam of radiation 916 to an extent depending upon the relative powers of the lens elements 912 and 914.

Figure 9D:
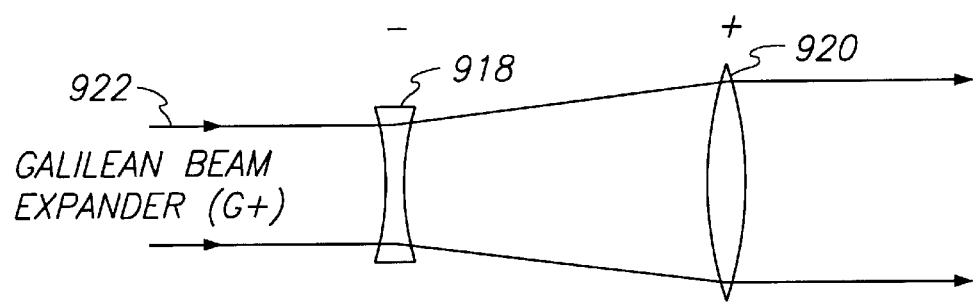
FIG. 9D shows a Galilean lens configuration in a beam expander configuration.

FIG. 9D shows a negative lens element 918 and a positive lens element 920 in a Galilean configuration to magnify or expand an incoming collimated beam of radiation 922 to an extent depending upon the relative powers of the lens elements 918 and 920.

FIGS. 10A–13B show how beam scaling or shaping can be obtained with the use of anamorphic mirror segments in Keplerian configurations, Galilean configurations or combinations of Keplerian and Galilean configurations.

Figure 10A:
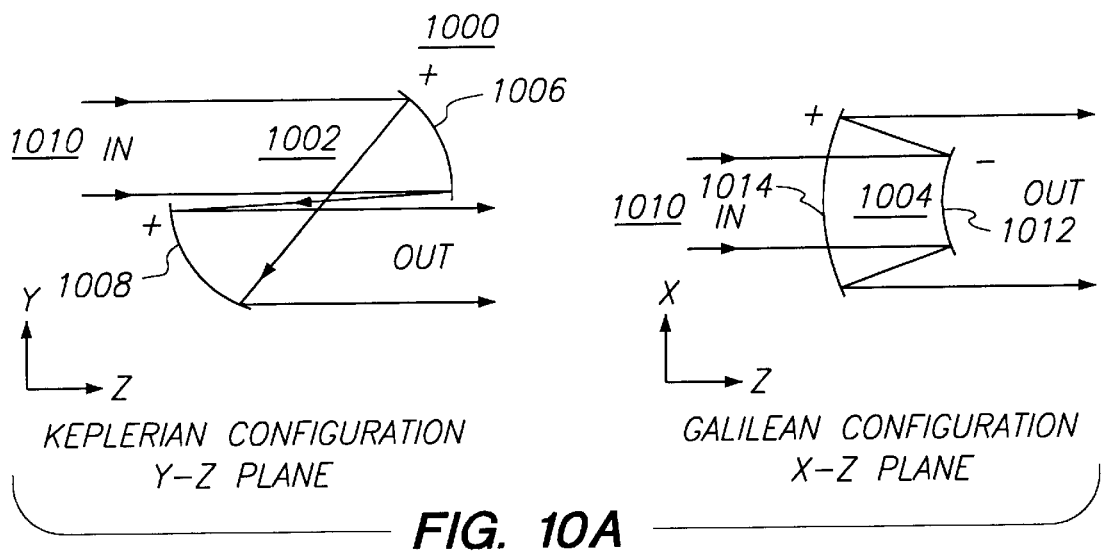
FIG. 10A illustrates a reflective anamorphic system having a Keplerian configuration in the y direction and a Galilean configuration in the x direction.

FIG. 10A shows a reflective anamorphic system 1000 with a Keplerian configuration 1002 of reflective surfaces having parabolic cross-sections in the y-z plane and a Galilean configuration 1004 of reflective surfaces having parabolic cross-sections in the x-z plane. The Keplerian configuration 1002 has a reflective surface 1006 having a positive (concave) parabolic cross-section in the y-z plane and a reflective surface 1008 having a positive parabolic cross-section in the y-z plane. The magnification of the collimated beam 1010 in the y direction is determined by the values of the base radii of curvature of the parabolic cross-sections of the surfaces 1006 and 1008 in the y-z plane. The Galilean configuration 1004 has a reflective surface 1012 having a negative (convex) parabolic cross-section in the x-z plane and a reflective surface 1014 having a positive parabolic cross-section in the x-z plane. The magnification of the collimated beam 1110 in the x direction is determined by the values of the base radii of curvature of the parabolic cross-sections of the surfaces 1012 and 1014 in the x-z plane.

Figure 10B:
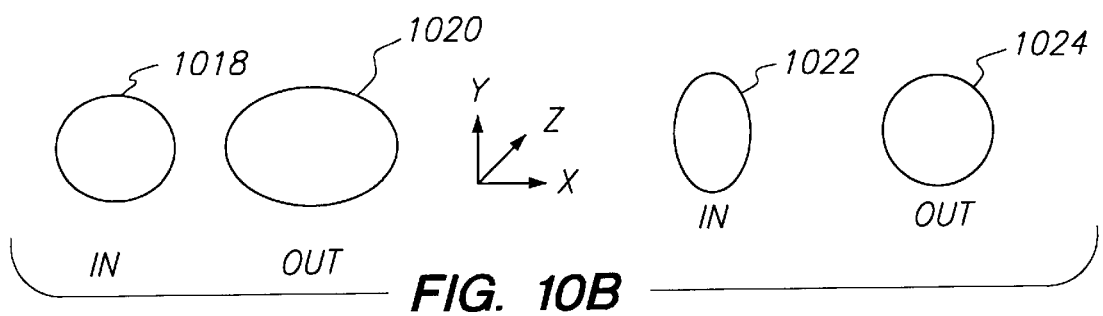
FIG. 10B shows the input and output beam shapes for the system shown in FIG. 10A.

FIG. 10B shows an incoming circular beam of radiation 1018 and the outgoing elliptical beam of radiation 1020 after it has been expanded or magnified in the x direction by the Galilean configuration of reflective surfaces 1012 and 1014 in the x-z plane shown in FIG. 10A. Also shown is an incoming elliptical beam of radiation 1022 and the outgoing circular beam of radiation 1024 after it has been expanded or magnified in the x direction by the Galilean configuration of reflective surfaces 1012 and 1014 in the x-z plane shown n FIG. 10A. The beam shaping capability of the anamorphic system 1000 is evident from these examples.

Figure 11A:
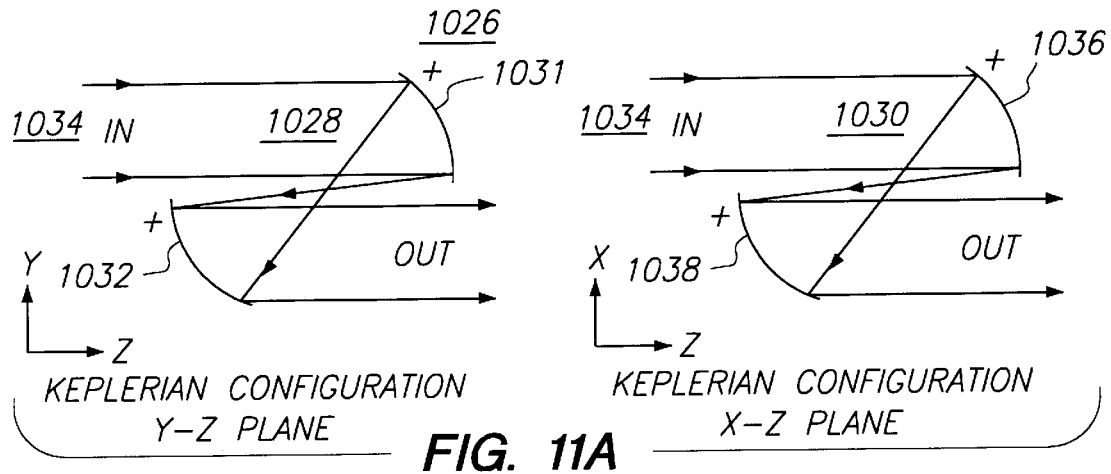
FIG. 11A illustrates an anamorphic mirror system having a Keplerian configuration in the y direction and a Keplerian configuration in the x direction.

FIG. 11A shows a reflective anamorphic system 1026 with a Keplerian configuration 1028 of reflective surfaces having parabolic cross-sections in the y-z plane and a Keplerian configuration 1030 of reflective surfaces having parabolic cross-sections in the x-z plane. The Keplerian configuration 1028 has a reflective surface 1030 having a positive parabolic cross-section in the y-z plane and a reflective surface 1032 having a positive parabolic cross-section in the y-z plane. The magnification of the collimated beam 1034 in the y direction is determined by the values of the base radii of curvature of the parabolic cross-sections of the surfaces 1031 and 1032 in the y-z plane. The Keplerian configuration 1030 has a reflective surface 1036 having a positive parabolic cross-section in the x-z plane and a reflective surface 1038 having a positive parabolic cross-section in the x-z plane. The magnification of the collimated beam 1034 in the x direction is determined by the values of the base radii of curvature of the parabolic cross-sections of the surfaces 1036 and 1038 in the x-z plane.

Figure 11B:
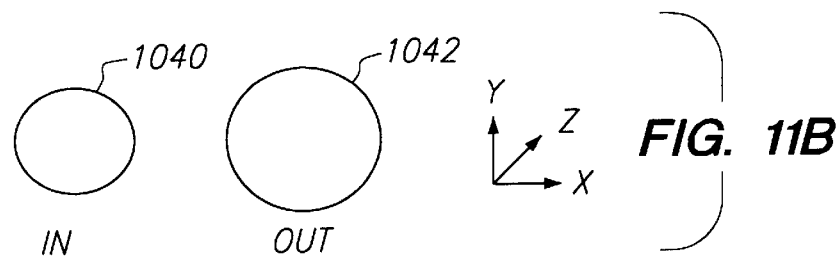
FIG. 11B shows the input and output beam shapes for the system shown in FIG. 11A.

FIG. 11B shows an incoming circular beam of radiation 1040 and the outgoing circular beam of radiation 1042 after it has been expanded or magnified in the y direction by the Keplerian configuration of reflective surfaces 1030 and 1032 in the y-z plane and after it has been expanded or magnified in the x direction by the Keplerian configuration of reflective surfaces 1036 and 1038 in the x-z plane.

Figure 12A:
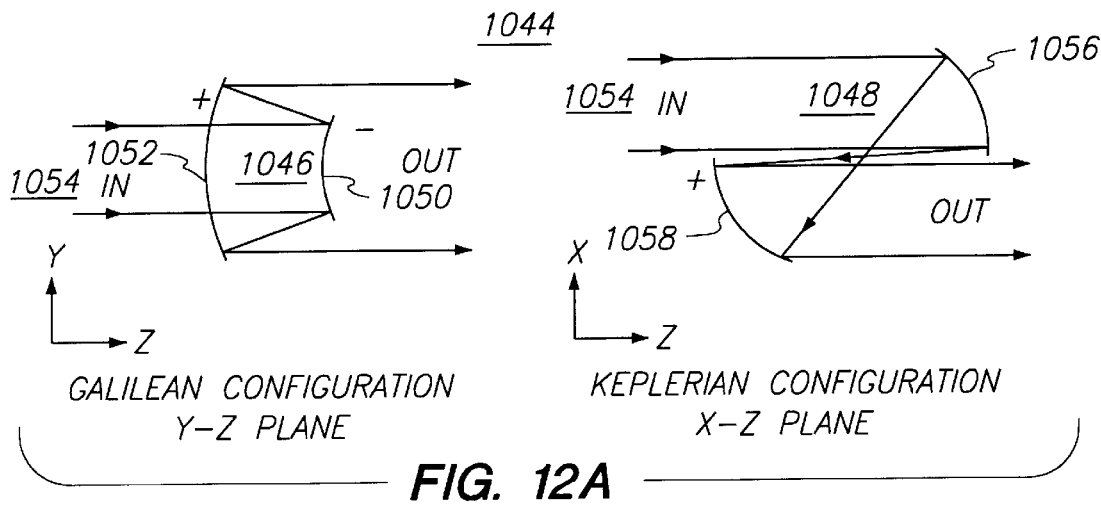
FIG. 12A illustrates an anamorphic mirror system having a Galilean configuration in the y direction and a Keplerian configuration in the x direction.

FIG. 12A shows a reflective anamorphic system 1044 with a Galilean configuration 1046 of reflective surfaces having parabolic cross-sections in the y-z plane and a Keplerian configuration 1048 of reflective surfaces having parabolic cross-sections in the x-z plane. The Galilean configuration 1046 has a reflective surface 1050 having a negative parabolic cross-section in the y-z plane and a reflective surface 1052 having a positive parabolic cross-section in the y-z plane. The magnification of the collimated beam 1054 in the y direction is determined by the values of the base radii of curvature of the parabolic cross-sections of the surfaces 1050 and 1052 in the y-z plane. The Keplerian configuration 1048 has a reflective surface 1056 having a positive parabolic cross-section in the x-z plane and a reflective surface 1058 having a positive parabolic cross-section in the x-z plane. The magnification of the collimated beam 1054 in the x direction is determined by the values of the base radii of curvature of the parabolic cross-sections of the surfaces 1056 and 1058 in the x-z plane.

Figure 12B:
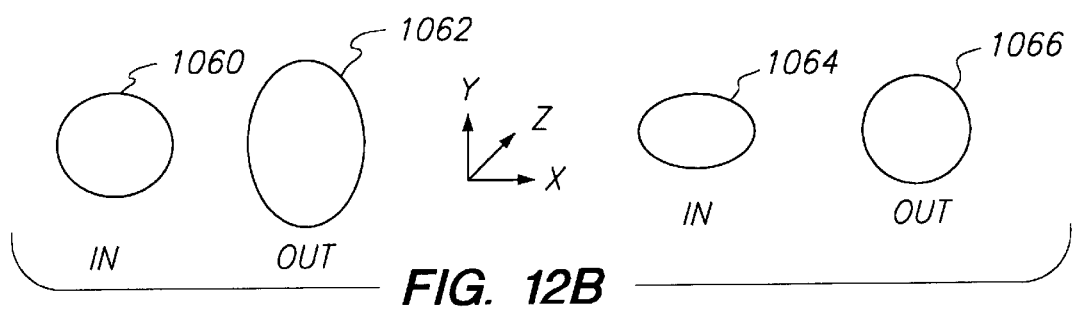
FIG. 12B shows the input and output beam shapes for the system shown in FIG. 12A.

FIG. 12B shows an incoming circular beam of radiation 1060 and the outgoing elliptical beam of radiation 1062 after it has been expanded in the y direction by the Galilean configuration of reflective surfaces 1050 and 1052 in the y-z plane shown in FIG. 12A. Also shown is an incoming elliptical beam of radiation 1064 and the outgoing circular beam of radiation 1066 after it has been expanded in the y direction by the Galilean configuration of reflective surfaces 1050 and 1052 in the y-z plane shown in FIG. 12A.

Figure 13A:
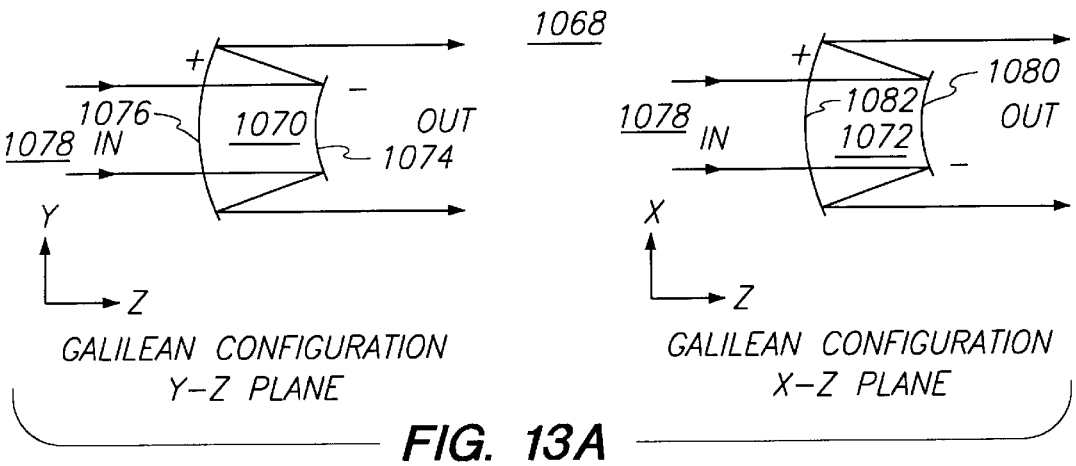
FIG. 13A illustrates an anamorphic mirror system having a Galilean configuration in the y direction and a Galilean configuration in the x direction.
Figure 13B:
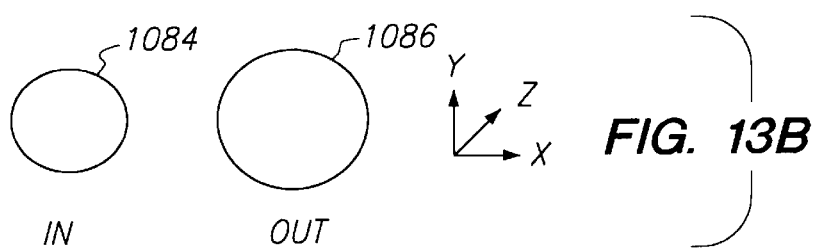
FIG. 13B shows the input and output beam shapes for the system shown in FIG. 13A.

FIG. 13A shows a reflective anamorphic system 1068 with a Galilean configuration 1070 of reflective surfaces having parabolic cross-sections in the y-z plane and a Galilean configuration 1072 of reflective surfaces having parabolic cross-sections in the x-z plane. The Galilean configuration 1070 has a reflective surface 1074 having a negative parabolic cross-section in the y-z plane and a reflective surface 1076 having a positive parabolic cross-section in the y-z plane. The magnification of the collimated beam 1078 in the y direction is determined by the values of the base radii of curvature of the parabolic cross-sections of the surfaces 1074 and 1076 in the y-z plane. The Galilean configuration 1072 has a reflective surface 1080 having a negative parabolic cross-section in the x-z plane and a reflective surface 1082 having a positive parabolic cross-section in the x-z plane. The magnification of the collimated beam 1078 in the x direction is determined by the values of the base radii of curvature of the parabolic cross-sections of the surfaces 1080 and 1082 in the x-z plane. FIG. 13B shows an incoming circular beam of radiation 1084 and the outgoing circular beam of radiation 1086 after it has been expanded or magnified in the y direction by the Galilean configuration of reflective surfaces 1074 and 1076 in the y-z plane shown in FIG. 13A and after it has been expanded or magnified in the x direction by the Galilean configuration of reflective surface 1080 and 1082 in the x-z plane shown in FIG. 13A.

In summary, the results and advantages of the anamorphic system and method of the present invention can now be more fully realized. The first and second reflective anamorphic surfaces provide beam shaping and scaling of a beam of radiation incident on the first reflective anamorphic surface. The first and second reflective anamorphic surfaces have parabolic cross-sections in orthogonal directions with the magnifications in the first and second directions determined by the base radii of curvatures of the parabolic cross-sections in the first and second directions. The method and apparatus can be utilized for applications in spectral regions that do not have appropriate refractive materials such as x-ray applications.

The foregoing description of the embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An anamorphic system comprising:
a first reflective anamorphic surface having a first aspheric cross-section in a first direction and a second aspheric cross-section in a second direction; and
a second reflective anamorphic surface having a third aspheric cross-section in the first direction and a fourth aspheric cross-section in the second direction, wherein a collimated beam of radiation incident on the first reflective anamorphic surface is reflected to the second reflective anamorphic surface.

2. The anamorphic system of claim 1 wherein the first aspheric cross-section in the first direction and the third aspheric cross-section in the first direction produce a magnification $M_1$ of the collimated beam of radiation in the first direction.

3. The anamorphic system of claim 2 wherein the second aspheric cross-section in the second direction and the fourth aspheric cross-section in the second direction produce a magnification $M_2$ of the collimated beam of radiation in the second direction.

4. The anamorphic system of claim 3 wherein $M_1$ can be positive, negative or one.

5. The anamorphic system of claim 4 wherein $M_2$ can be positive, negative or one.

6. The anamorphic system of claim 5 wherein the first aspheric cross-section is a parabolic cross-section having a base radius of curvature $R_1$ and the third aspheric cross-section is a parabolic cross-section having a base radius of curvature $R_3$.

7. The anamorphic system of claim 6 wherein $M_1$ is equal to $R_3/R_1$.

8. The anamorphic system of claim 7 wherein the second aspheric cross-section is a parabolic cross-section having a base radius of curvature $R_2$ and the fourth aspheric cross-section is a parabolic cross-section having a base radius of curvature $R_4$.

9. The anamorphic system of claim 8 wherein $M_2$ is equal to $R_4 R_2$.

10. The anamorphic system of claim 9 wherein the second direction is orthogonal to the first direction.

11. A method of anamorphically shaping a beam of radiation, the method comprising directing the beam of radiation onto a first reflective anamorphic surface having a first aspheric cross-section in a first direction and a second aspheric cross-section in a second direction wherein the beam of radiation is reflected by the first reflective anamorphic surface to a second reflective anamorphic surface having a third aspheric cross-section in the first direction and a fourth aspheric cross-section in the second direction.

12. The method of claim 11 further comprising producing a magnification $M_1$ of the beam of radiation in the first direction wherein the magnification $M_1$ is produced by the first aspheric cross-section and the third aspheric cross-section.

13. The method of claim 12 further comprising producing a magnification $M_2$ of the beam of radiation in the second direction wherein the magnification $M_2$ produced by the second aspheric cross-section and the fourth aspheric cross-section.

14. The method of claim 13 wherein the produced magnification $M_1$ can be positive, negative or one.

15. The method of claim 14 wherein the produced magnification $M_2$ can be positive, negative or one.

16. The method of claim 15 wherein the first aspheric cross-section is a parabolic cross-section having a base radius of curvature $R_1$ and the third aspheric cross-section is a parabolic cross-section having a base radius of curvature $R_3$.

17. The method of claim 16 wherein the produced magnification $M_1$ is equal to $R_3/R_1$.

18. The method of claim 17 wherein the second aspheric cross-section is a parabolic cross-section having a base radius of curvature $R_2$ and the fourth aspheric cross-section is a parabolic cross-section having a base radius of curvature $R_4$.

19. The method of claim 18 wherein the produced magnification $M_2$ equal to $R_4/R_2$.

20. The method of claim 19 wherein the second direction is orthogonal to the first direction.

* * * * *